Sept. 1, 1964     A. D. GOETTL     3,147,319
EVAPORATIVE COOLER CONSTRUCTION
Filed Jan. 10, 1961     2 Sheets-Sheet 1
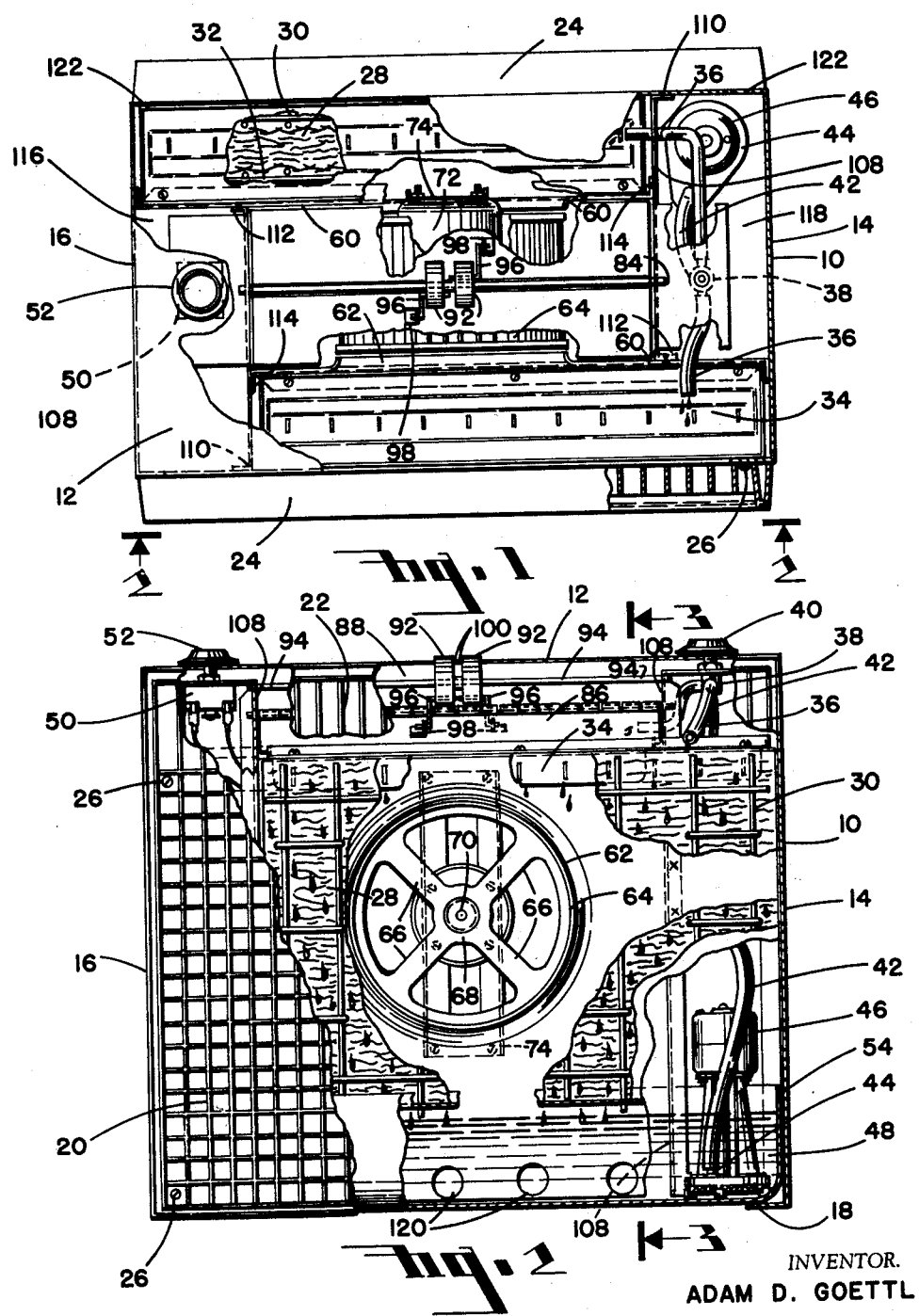
INVENTOR.
ADAM D. GOETTL
BY
PATENT AGENT Sept. 1, 1964   A. D. GOETTL   3,147,319
EVAPORATIVE COOLER CONSTRUCTION
Filed Jan. 10, 1961   2 Sheets-Sheet 2

INVENTOR.
ADAM D. GOETTL
BY
*Wm. H. Dean*
PATENT AGENT

United States Patent Office 3,147,319
Patented Sept. 1, 1964

3,147,319
EVAPORATIVE COOLER CONSTRUCTION
Adam D. Goettl, Phoenix, Ariz., assignor to McGraw-Edison Company, Milwaukee, Wis., a corporation of Delaware
Filed Jan. 10, 1961, Ser. No. 81,734
5 Claims. (Cl. 261—29)

This invention relates to an evaporative cooler construction and more particularly to an evaporative cooler construction of the compact portable type having a great evaporative cooler pad area and air delivery capacity in proportion to its size.

Conventional portable evaporative coolers have lacked sufficient pad area and air delivery capacity to be most effective in cooling or conditioning air. Most portable air conditioners of the evaporative cooler type deliver air from only one side thereof and are provided with evaporative cooler pads of a relatively limited area as compared to that of the present invention. Furthermore, conventional evaporative coolers do not deliver air in more than one direction without changing the location or position thereof. The construction of conventional evaporative coolers generally permits only a very small blower wheel to be used and consequently such portable evaporative coolers do not have sufficient capacity to deliver substantial amounts of conditioned or cooled air. Furthermore, such small blower wheels must be operated at high speed in order to deliver an appreciable amount of air. These small blowers, operating at high speeds, are very noisy and such noise is projected beyond the area of cool air delivered thereby.

Most prior art portable evaporative coolers are so constructed that they must be supported in an elevated position above the floor of a room by means of a stand, or the like, which not only involves the investment in, or the purchase of additional equipment, but places the center of gravity of such portable coolers at a considerable distance above the floor thereby making them unwieldy, and in some instances, these coolers tend to tip quite easily.

Accordingly, it is an object of the present invention to provide a portable evaporative cooler which is very compact in proportion to its air delivery volume and air conditioning capacity.

Another object of the present invention is to provide a portable evaporative cooler which is provided with air inlet evaporative cooler pads on opposite sides thereof together with a pair of opposed cool air delivery outlets above said evaporative cooler pads permitting a large volume of air to be conditioned and delivered in opposite directions from a portable evaporative cooler in accordance with the invention.

Another object of the invention is to provide a portable evaporative cooler having cool air delivery outlet grills disposed to deliver air in opposite directions whereby the flow of cool air from said cooler in said opposite directions from a central location in a room is capable of providing comfort over a much greater area in the room than an evaporative cooler which delivers cool air from only one of its sides.

Another object of the invention is to provide a portable evaporative cooler having cool air delivery outlets on opposite sides thereof whereby cool air may be directed onto two individuals or separate spaces concurrently, if desired.

Another object of the invention is to provide a portable evaporative cooler having evaporative cooler pads communicating with opposite sides thereof and forming air inlets which receive air to be delivered through outlet grills of said evaporative cooler which are disposed above the evaporative cooler pads; said outlet grills being located at a sufficient elevation properly to deliver air in a stream which will travel a considerable distance from the cooler, whereby the space normally used for a stand to carry an evaporative is used to contain the evaporative cooler pads thereby greatly increasing the potential evaporative cooling capacity of a space normally occupied by a conventional portable evaporative cooler on a conventional stand.

Another object of the invention is to provide a portable evaporative cooler having evaporative cooler pads on opposite sides thereof and outlet grills thereabove whereby a large diameter blower may be accommodated so that a great mass flow of air may be delivered at a relatively low blower speed which is conducive to quiet operation of the evaporative cooler of the present invention.

Another object of the invention is to provide a portable evaporative cooler which comprises evaporative cooler pads in opposite sides thereof thereby permitting the use of common parts on opposite sides of the cooler which greatly simplifies the construction thereof in addition to a reduction in costs of tools and labor.

Another object of the invention is to provide a portable evaporative cooler having evaporative cooler pads on opposite sides thereof and corresponding outlet grills on opposite sides thereof, either or both of which may be utilized to deliver cool air in varying proportions in accordance with control dampers adjustable to direct all or a portion of the cool air, passing from said pad, in either direction at either opposite sides of the evaporative cooler of the invention.

Another object of the invention is to provide an evaporative cooler construction of this class, wherein blower noise is reflected backwardly into the cooler due to a structural arrangement of parts of the cooler, together with damper mechanism utilized to provide a change in direction of the noise as well as the cool air flowing from the cooler.

Another object of the invention is to provide an evaporative cooler construction wherein evaporative cooler pad supports and partitions extend vertically through the structure of the evaporative cooler, in accordance with the present invention, thereby providing structural support for the components of the device as well as baffles in the pan or sump of the evaporative cooler construction.

Another object of the invention is to provide an evaporative cooler construction wherein several common parts provide a double sided evaporative cooler structure and also form separate compartments for electrical and pump accessories thereby permitting all of the control features readily to be installed on the top of the cooler.

Further objects and advantages of the invention may be apparent from the following specification, appended claim, and accompanying drawings, in which:

FIG. 1 is a top or plan view of the evaporative cooler construction, in accordance with the present invention, showing portions broken away and in section to amplify the illustration;

FIG. 2 is a side elevtional view of the evaporative cooler construction of the present invention showing portions broken away and in section to amplify the illustration.

Figure 3:
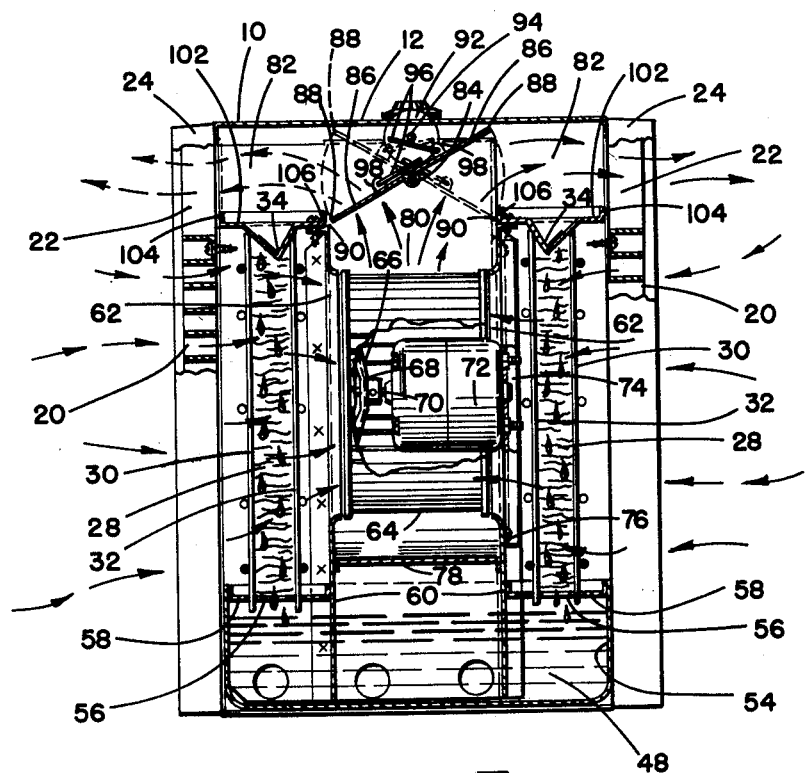
FIG. 3 is a vertical sectional view of the evaporative cooler construction of the invention, taken from the line 3—3 of FIG. 2.

As shown in FIG. 1 of the drawings, the evaporative cooler construction of the invention comprises an outer wrap around housing structure 10 preferably made of sheet metal. This housing includes a top 12 and sides 14 and 16 which are all integral with each other. Each side 14 and 16 is similar in construction, it being noted that the side 14 is provided with a lower flange 18 which is disposed at the bottom of evaporative cooler construction, as shown in FIG. 2 of the drawings.

Each opposite side of the evaporative cooler construction is provided with an air inlet grill 20 and an air outlet grill 22. These grills are duplicate parts and comprise conventional plastic or other construction having intersecting bars or any other desired foraminous structure which will permit the delivery of air therethrough. The grills 20 and 22 are preferably made of one integral casting or structural unit assembled within a frame 24. Each frame 24 is mounted by screws 26 or any other suitable means, as desired, at each opposite side of the evaporative cooler construction. It will be seen that while each frame 24 carries a horizontal flow air inlet grill 20 and a horizontal flow air outlet grill 22, that such grills, as shown in FIG. 2 of the drawings, are distinguished by the structure of the bars. As for example, the grill 20 may have horizontally and vertically disposed bars which intersect each other while the grill 22 may be composed only of vertical bars. This construction, however, is optional and the entire grill assembly may include common intersecting bars or grill work of any desired configuration. Additionally, each frame 24 may contain adjustable louvers for varying the direction of the air in each section 22 which serves as the cool air outlet for each side of the evaporative cooler.

Disposed inwardly of each grill section 20 at each opposite side of the evaporative cooler is an evaporative cooler pad 28. Each evaporaitve cooler pad 28 is supported by a wire mesh or other suitable pad rack 30 on its outer side and a similar foraminous pad rack 32 on its inner side. The pads 28 require these pad rack supports since they are usually made of fibers such as aspen wood fibers, or the like.

Disposed above each pad 28 is a water delivery trough 34 which may be of suitable conventional construction. These troughs 34 are provided with conventional openings therein which permit water to drain therefrom and downwardly through the fibrous pads 28. Communicating with each trough 34 is a water delivery tube 36, as shown in FIG. 2 of the drawings. This tube 36 is coupled to a valve 38 disposed to regulate the volume of water passing into the troughs 34 or to shut the water off during times when the portable evaporative cooler is used merely as a circulating fan device.

Coupled with valve 38 is a manual control knob 40 for external adjustment of the valve.

Communicating with the valve 38 is a tube 42 which is coupled to the outlet of a pump 44 driven by a motor 46.

The pump 44 is disposed in a sump portion 48 of the evaporative cooler, as will be hereinafter described.

The pump motor 46 is controlled by and electrically coupled to a switch 50 having a manual control knob 52 located at the top of the evaporative cooler construction of the invention.

The sump 48 is formed by a pan 54 and is disposed to contain water which drains downwardly from the evaporative cooler pad 28 through openings 56 in pad rack supporting plates 58 which are spot welded or otherwise secured to the sides of the pan 54 and also to blower supporting partitions 60. It will be understood that the supporting plates 58 are common parts and that the blower supporting plates 60 are common parts, all as will be hereinafter described in detail. The blower supporting plates 60 are disposed inwardly of the pad racks 32. As shown in FIG. 3 of the drawings, these blower supporting plates 60 extend to the bottom of the sump 48 and form splash baffles therein. Above the pad supporting plates 58, the blower supporting plates 60 are provided with blower inlet eyes 62. Thus, these blower supporting plates 60 actually form components of the blower housing wherein a conventional double ended cylindrical blower is rotatably mounted. This blower 64 is provided with spokes 66 in one end and centrally connected to these spokes 66 is a hub 68 mounted on a shaft 70 of an electric motor 72.

This electric motor 72 is bolted, or otherwise secured to a motor mount plate 74 which spans the inlet eye 62 on one side of the blower and this motor mount plate 74 is secured by screws 76 to a respective blower supporting plate 60.

It will be obvious to those skilled in the art that the motor mount plate 74 may be secured on either of the plates 60, as desired, since they are duplicate parts and since the blower is a double ended blower of the centrifugal type.

Secured between the blower supporting plates 60 is a blower scroll plate 78. This blower scroll plate 78 is of conventional form and may be secured, by spot welding or other means as desired, between the plates 60 in order to complete the blower housing structure. This blower scroll plate 78 is provided with an outlet 80 directly above the blower wheel 64 whereby the outlet of the blower communicates through passages 82 with the grills 22, hereinbefore described. These grills 22 are the cool air horizontal flow delivery grills hereinbefore referred to.

A damper shaft 84 is mounted centrally above the blower outlet 80 and carries a pair of individually pivoted damper plates 86. These damper plates 86 include substantially conventional hinge elements mounted on the shaft 84.

The damper plates 86 are provided with freely movable edges 88 which may be moved into close proximity with the normally upper edges 90 of the blower supporting plates 60 or these edges 88 may be pivoted upwardly adjacent to the top 12, as desired, whereby each or both of the passages 82 may be restricted or completely opened, as desired, and as will be hereinafter described in the operation of the evaporative cooler construction.

Coupled to each damper plate 86 is a manual control wheel 92 mounted on a shaft 94. Pivotally connected to each wheel 92 is a link 96 having its opposite ends pivoted to a lug 98 on the respective damper plate 86. Peripheral portions of each wheel 92 extends above the top 12 and through a respective slot 100 therein so that the wheels may be manually rotated in order to pivot the dampers 86 from the solid line positions, shown in FIG. 3, to the broken line positions shown therein, or vice versa, as desired.

It will be seen that each trough 34 is provided with an integral baffle plate 102 which is provided with flanges 104 and 106. Each flange 106 is connected by screws, or otherwise, to a flange at the upper edge 90 of each blower supporting plate 60.

As shown in FIG. 1 of the drawings, a pair of duplicate partition members 108 are provided with flanges 110 and 112. Each partition member 108 is connected by spot welding, or otherwise, to a flange 114 at one vertical edge of one of the blower supporting plates 60. Each of the plates 108 at its flange 112 is spot welded or otherwise fixed to the other of the blower supporting plates 60 whereby spaces 116 and 118 are provided at the ends of the respective blower supporting plates 60 for containing controls and the pump 44, respectively. It will be understood that the lower ends of the plates 108 extend down into the sump 48 to the bottom of the pan 54 in order to provide baffles. As shown in FIG. 1 of the drawings, the evaporative cooler pads 28 and corresponding trough 34 are not coextensive laterally with the grills 20 since the spaces 116 and 118 are disposed at the ends of the evaporative cooler pads 28 and troughs 34. This is accomplished by the alternately offset relationship of the blower supporting plates 60, as hereinbefore described.

It will be seen that the shaft 84, which forms a pivotal mount for the damper plates 86, is supported in the plates 108, hereinbefore described. Opposite ends of the shaft 84 extend through openings in these plates 108 and likewise the shaft 94, as shown in FIG. 2 of the drawings, at its opposite ends, is mounted in the plates 108.

The blower supporting plates 60 and the plates 108, which extend downwardly into the sump 48 near the bottom of the pan 54, are all provided with openings such as the openings 120 in the plates 60 near their lower edges. These openings provide for communication throughout the entire sump area while the physical structure, at the lower portions of these plates, prevents splashing in the pan when the portable evaporative cooler is moved about.

It will be seen, from FIGS. 1 and 3 of the drawings, that the outer surfaces of the pan 54, the flanges 104 of the plates 102, and the flanges 110 of the plates 108, together with flanges 122 of the wrap around cover 10 all provide support for the grill frames 24 which contain the louver grills 20 and 22, hereinbefore described.

The wrap around plate 10 covers the top and sides of the evaporative cooler construction, in accordance with the invention, and is reversible from side to side between the louver frames 24, as shown best in FIGS. 1 and 2 of the drawings.

In operation of the evaporative cooler construction according to the present invention, the motor 72 is energized concurrently with energization of the pump motor 46, or may be energized in succession thereto, as desired. However, when the blower motor 72 and pump motor 46 are both in operation, as controlled by the knob 52, water is delivered to the troughs 34 through the tubes 36 by the pump 44 driven by the motor 46. Concurrently the blower 64 is rotated by the motor 72 which causes air to pass inwardly through the evaporative cooler pads 28 which are wet due to the drainage of water downwardly therethrough from the troughs 34. Thus, air passing through the evaporative cooler pads 28 is cooled and is delivered from the blower scroll 78 upwardly toward the damper plates 86. The cool air then passes upwardly through the substantially horizontal ducts 82 and outwardly through the grills 22, as hereinbefore described. It will be seen that either of the damper plates 86 may be pivoted individually by one of the wheels 92, as hereinbefore described, and that all of the air may be delivered through one of the grills 22, or all of the air may be delivered through the other of the grills 22. The damper plates 86, when in other adjusted positions, may permit varying amounts of the air to pass through both of the grills concurrently.

It will be obvious that the evaporative cooler construction, as shown in FIG. 3 of the drawings, may be located between two persons or between two areas to be cooled and that the overall distance covered by the cool air passing from the evaporative cooler of the present invention is much greater than that covered by air passing from a single grill of a conventional evaporative cooler. Further, it will be appreciated that the location of the evaporative cooler pads 28 below the ducts 82 and outlet grills 22 provides a very compact construction wherein great evaporative cooler pad area may be accomodated in a space the same size as is normally occupied by a portable evaporative cooler on a stand. Thus, the space all the way to the floor may be utilized and accordingly large evaporative cooler pads on opposite sides of the evaporative cooler may be accommodated. Additionally, a large diameter blower 64 may be operated at relatively low peripheral speeds as compared to the speeds of small blowers of conventional evaporative coolers of the portable type. Thus, the operation of the blower 64 at low peripheral speed creates a minimum amount of noise and due to the large diameter of this blower, it delivers a great mass flow of air through the large evaporative cooler pads and into the ducts 82 from which the air is delivered through the outlet grills 22.

It will be appreciated that the duplicate parts 58, 60, and 108, together with the duplicate troughs 34 and evaporative cooler pads and their respective structures, provide for economy in the production of the evaporative cooler construction of the present invention. Additionally, the partition arrangement of these structures, shown in FIG. 1 of the drawings, permits convenient location of all of the equipment of the evaporative cooler including the pump 46 and controls 52 which are provided with separate compartments.

The plates 60 and 108, forming partitions, and extending vertically to the bottom of the sump 54 provide splash resisting structure which prevents water in the sump from splashing, slushing, and spilling, while the evaporative cooler construction of the invention is transported or moved about from time to time.

It will be obvious to those skilled in the art that various modifications of the invention may be resorted to in a manner limited only by a just interpretation of the following claims.

I claim:

1. In an evaporative cooler construction the combination of: an evaporative cooler comprising a housing having opposite sides each provided with an inlet grill and outlet grill; an evaporative cooler pad inwardly of each of said inlet grills; means for supplying water to the upper portions of said pads; a sump within said housing below said pads; a blower within said housing having inlet means disposed to effect air flow inwardly through said inlet grills and through said evaporative cooler pads; a blower outlet for said blower disposed at the top thereof; laterally disposed duct means communicating with said blower outlet and each of said outlet grills; each of said outlet grills being disposed above a respective inlet grill; and damper means disposed alternately to modulate or shut off flow from said blower outlet to either of said duct means and a respective outlet grill, said damper means comprising a pair of damper plates pivotally disposed over said blower outlet and individually positionable in the flow from said blower outlet to respective duct means to control air flow from said blower outlet into respective duct means whereby to proportion flow between said duct means, wherein said damper plates are mounted on a common axis and pivotal therearound, said common axis being disposed over said blower outlet.

2. In an evaporative cooler construction the combination of: an evaporative cooler having a housing with opposite sides each having an inlet grill and an outlet grill; an evaporative cooler pad inwardly of each of said grills; means for supplying water to the upper portions of said pads; a sump structure within said housing below said pads; a cylindrical blower within said housing disposed to effect air flow inwardly through said grills and through said evaporative cooler pads; a blower outlet for said blower disposed thereabove; and laterally disposed duct means communicating with said blower outlet and respective grills; substantially vertical support plates spaced to support said blower at opposite sides thereof and having openings therein forming inlet eyes for said blower; said blower having opposed inlets communicating with said eyes, each of said eyes communicating with one of said evaporative cooler pads, said support plates extending to said sump structure and being secured thereto and effecting splash baffles therein.

3. In an evaporative cooler construction the combination of: an evaporative cooler housing having opposite sides each provided with an inlet grill and an outlet grill; an evaporative cooler pad at each inlet grill; means for supplying water to the upper portions of said pads; a sump within said housing below said pads; a cylindrical blower within said housing disposed to effect air flow through said inlet grills and said evaporative cooler pads; a blower outlet, and laterally disposed duct means communicating with said blower outlet and respective housing outlet grills; a first pair of substantially vertical plates spaced apart and supporting said blower and having openings therein forming inlet eyes for said blower; said blower having opposed inlets communicating with said eyes, each of said eyes communicating with one of said evaporative cooler pads, said plates being substantially parallel and extending downwardly into said sump and forming splash baffles therein; a second pair of substantially vertical plates, one plate of which is disposed transversely of and adjacent one end of one of said first pair of plates and extending substantially to the other of said first pair of plates, the other of said second plates being disposed transversely of and adjacent an end of the other of said first pair of plates and extending substantially to the said one of said first pair of plates; said arrangement of plates forming a pair of compartments, said second pair of plates extending into said sump structure and forming splash baffles therein, and each of said second pair of plates being secured to each of said first pair of plates, and a cover member closing said compartments.

4. In an evaporative cooler as set forth in claim 3, a pump in one compartment and controls for said evaporative cooler in the other compartment.

5. A construction for a portable evaporative cooler comprising a housing having opposite sides each provided with an inlet grill and an outlet grill, a sump structure at the bottom of said housing and a blower centrally disposed within said housing and having axially opposed inlets communicating with said housing inlet grills and a radially disposed outlet, outlet flow control means, duct means extending laterally from said blower outlet and communicating with respective housing outlet grills, said blower and said blower outlet and said duct means and said outlet flow control means being symmetrically arranged with respect to said housing sides and said flow control means being disposed between said blower outlet and respective duct means and operative to control flow to respective duct means; one pair of spaced vertical plates extending upwardly from said sump structure and forming splash baffles therein and connected to said blower for support thereof, another pair of spaced plates connected between said one pair of plates and extending into said sump structure and forming splash baffles therein; the plates of each pair being identical and offset from each other, the arrangement of said plates effecting a pair of compartments within said housing at opposite sides thereof, and evaporative cooler pads disposed inwardly of said inlet grills.

References Cited in the file of this patent

UNITED STATES PATENTS

| | | |
|---|---|---|
| 2,197,974 | Feinberg | Apr. 23, 1940 |
| 2,350,591 | Coey | June 6, 1944 |
| 2,503,667 | Hagen | Apr. 11, 1950 |
| 2,681,609 | Drager | June 22, 1954 |
| 2,705,623 | Glassenhart et al. | Apr. 5, 1955 |
| 2,752,134 | Paulus | June 26, 1956 |
| 2,788,198 | Anderson | Apr. 9, 1957 |
| 2,796,014 | Montgomery et al. | June 18, 1957 |

FOREIGN PATENTS

| | | |
|---|---|---|
| 856,676 | France | Apr. 1, 1940 |